US010869459B1

(12) United States Patent
Dulko et al.

(10) Patent No.: US 10,869,459 B1
(45) Date of Patent: Dec. 22, 2020

(54) SODIUM ALUMINUM SULFATE FOR USE IN ANIMAL LITTERS

(71) Applicant: USALCO, LLC, Baltimore, MD (US)

(72) Inventors: James M. Dulko, Pasadena, MD (US); Bruce Wonder, Abingdon, MD (US)

(73) Assignee: USALCO, LLC, Baltimore, MD (US)

( * ) Notice: Subject to any disclaimer, the term of this patent is extended or adjusted under 35 U.S.C. 154(b) by 178 days.

(21) Appl. No.: 16/237,286

(22) Filed: Dec. 31, 2018

Related U.S. Application Data

(60) Provisional application No. 62/612,951, filed on Jan. 2, 2018.

(51) Int. Cl.
| | |
|---|---|
| *A01K 1/015* | (2006.01) |
| *A01K 45/00* | (2006.01) |
| *B01J 20/04* | (2006.01) |
| *C01F 7/76* | (2006.01) |

(52) U.S. Cl.
CPC ............ *A01K 1/0154* (2013.01); *A01K 45/00* (2013.01); *B01J 20/045* (2013.01); *C01F 7/767* (2013.01)

(58) Field of Classification Search
CPC .. A01K 1/0152; A01K 1/0155; A01K 1/0154; A01K 1/01; A01K 1/015; C05F 3/00; C05F 11/00; B01J 20/2803; C01F 7/767
USPC ....... 119/173, 171, 231, 442, 447; 424/76.6, 424/682, 76.8
See application file for complete search history.

(56) References Cited

U.S. PATENT DOCUMENTS

| | | | | |
|---|---|---|---|---|
| 7,011,824 B2 * | 3/2006 | Moore, Jr. | ............... | C02F 11/14 119/432 |
| 7,194,979 B2 * | 3/2007 | Moore, Jr. | ............ | A01K 1/0047 119/448 |
| 7,438,815 B1 * | 10/2008 | Moore, Jr. | ............... | A01C 3/00 210/610 |
| 7,617,798 B2 * | 11/2009 | Stevenson | ............ | A01K 1/0152 119/28.5 |
| 8,074,605 B2 * | 12/2011 | Hurwitz | ............... | A01K 1/0152 119/171 |
| 8,662,019 B2 * | 3/2014 | Eutsler | ...................... | A01K 1/01 119/442 |
| 8,663,551 B1 * | 3/2014 | Moore, Jr. | ............. | B01D 53/58 422/4 |
| 8,757,092 B2 * | 6/2014 | Boote | .................. | A01K 1/0152 119/28.5 |
| 2009/0298963 A1 * | 12/2009 | Matsumoto | ............. | C08L 33/02 522/59 |

* cited by examiner

*Primary Examiner* — Yvonne R Abbott-Lewis
(74) *Attorney, Agent, or Firm* — Sunstein LLP (57) ABSTRACT

A method for producing a mixed salt of sodium and aluminum includes providing a solution comprising water, sodium chloride and sulfuric acid, heating the solution to a temperature between 180° F. and 300° F. so that the sodium chloride reacts with the sulfuric acid to form sodium bisulfate and hydrochloric acid and then continue heating until the solution is essentially free of the hydrochloric acid, adding aluminum or an aluminum compound to the solution to form the mixed salt comprising a sodium aluminum sulfate compound and solidifying the mixed salt to form the sodium aluminum sulfate compound.

18 Claims, 7 Drawing Sheets

SODIUM ALUMINUM SULFATE FOR USE IN ANIMAL LITTERS

CROSS-REFERENCE TO RELATED APPLICATIONS

This patent application claims the benefit of U.S. Provisional Patent Appl. No. 62/612,951 filed Jan. 2, 2018, the disclosure of which is incorporated by reference herein in its entirety.

TECHNICAL FIELD

The present invention relates to mixed salts of sodium and aluminum, and more particularly to their use as poultry and livestock litter additions.

BACKGROUND ART

Animal litters produce ammonia as a byproduct of microbial growth. Aluminum sulfate and sodium bisulfate have been widely used to reduce the ammonia volatilization that occurs in animal litters. Aluminum sulfate and sodium bisulfate are both acidulants that neutralize ammonia by lowering the pH. Aluminum sulfate can also react with ammonia to form nonvolatile compounds. Volatile ammonia can be expressed as ammonium hydroxide ($NH_4OH$). Ammonium hydroxide neutralization with sodium bisulfate can be expressed as follows:

$$2NaHSO_4 \cdot H_2O + 2NH_4OH \rightarrow (NH_4)_2SO_4 + Na_2SO_4 + 4H_2O \quad (1)$$

Ammonium hydroxide neutralization with aluminum sulfate can be expressed as follows:

$$6NH_4OH + Al_2(SO_4)_3 \cdot 14H_2O \rightarrow 3(NH_4)_2SO_4 + Na_2SO_4 + 4H_2O \quad (2)$$

Other side reactions that may occur, which also help to dry the animal litter include:

$$Al_2(SO_4)_3 \cdot 14H_2O + Na_2SO_4 + 10H_2O \rightarrow 2NaAl(SO_4)_2 \cdot 12H_2O \quad (3)$$

and $$Al_2(SO_4)_3 \cdot 14H_2O + (NH_4)_2SO_4 + 10H_2O \rightarrow 2NH_4Al(SO_4)_2 \cdot 12H_2O \quad (4)$$

Both aluminum sulfate and sodium bisulfate have certain drawbacks in their effectiveness as a litter amendment. Sodium bisulfate reacts quickly and has good hydroscopic properties, but it is also exhausted quickly. Sodium bisulfate can also leave a wet litter that can be detrimental to the health of the animals. In addition, sodium bisulfate does not have the ability to bind phosphorous. This is an issue when animal litter is applied as a fertilizer, and the phosphorous is not retained in the soil to benefit the crop. Instead, the phosphorous tends to leach its way into bodies of water where it fertilizes algae causing uncontrolled algae growth.

Aluminum sulfate has the benefit that it reacts with phosphorous in the litter to make an insoluble compound that will not leach out of the litter when used as a soil amendment. However, aluminum sulfate has difficulty activating in low humidity environments and can stop working altogether under these conditions. Therefore, aluminum sulfate is not effective during the winter when relative humidity and litter moisture content are reduced.

SUMMARY OF THE EMBODIMENTS

In accordance with one embodiment of the invention, a method for producing a mixed salt of sodium and aluminum includes providing a solution comprising water, sodium chloride and sulfuric acid, heating the solution to a temperature between 180° F. and 300° F. (82° C. and 149° C.) so that the sodium chloride reacts with the sulfuric acid to form sodium bisulfate and hydrochloric acid and then continue heating until the solution is essentially free of the hydrochloric acid, adding aluminum or an aluminum compound to the solution to form the mixed salt comprising a sodium aluminum sulfate compound and solidifying the mixed salt to form the sodium aluminum sulfate compound.

In related embodiments, the sodium aluminum sulfate compound may include sodium aluminum sulfate, sodium aluminum bisulfate and/or sodium aluminum hydrosulfate. The sodium aluminum bisulfate may be of the formula $Na_2Al_2H_2(SO_4)_5 \cdot (x+6)H_2O$ where x is a positive integer ranging from 6 to 14. The sodium aluminum sulfate compound may be sodium aluminum bisulfate and the method may further include digesting aluminum oxide trihydrate in an aqueous solution of sodium bisulfate and the sulfuric acid to form the sodium aluminum bisulfate. The method may further include reacting sulfuric acid and the sodium chloride to form the sodium bisulfate. A ratio of the sodium bisulfate to the aluminum compound may be about 20:80 wt % to about 40:60 wt %, and preferably about 30:70 wt % to about 35:65 wt %. The method may further include off-gassing HCl from the mixed salt. The aluminum compound may be selected from the group consisting of $Al_2O_3$, $Al_2O_3 \cdot 3H_2O$, bauxite and/or aluminum clay. The solidifying may include cooling the mixed salt to below its freezing point.

In accordance with another embodiment of the invention, a sodium aluminum sulfate compound is manufactured according to any of the methods mentioned above. The sodium aluminum sulfate compound may be essentially free of sulfuric acid. The sodium aluminum sulfate compound may include sodium aluminum sulfate, sodium aluminum bisulfate and/or sodium aluminum hydrosulfate.

In accordance with another embodiment of the invention, a poultry or livestock litter amendment includes the sodium aluminum sulfate compound mentioned above manufactured according to any of the methods mentioned above.

In accordance with another embodiment of the invention, a method for controlling ammonia levels in an enclosure for raising poultry or livestock includes providing the litter amendment mentioned above and applying the litter amendment to a portion of the enclosure. In related embodiments, the enclosure may have an atmospheric humidity of below 45% or below 35%. The enclosure may have a temperature of below about 86° F. (30° C.).

BRIEF DESCRIPTION OF THE DRAWINGS

The foregoing features of embodiments will be more readily understood by reference to the following detailed description, taken with reference to the accompanying drawings, in which:

FIGS. 3A-3C are graphs showing water absorption as a function of relative humidity levels for three types of litter amendments, a mixed salt (shown as "New") formed according to embodiments of the present invention, sodium bisulfate (shown as "SB"), and aluminum sulfate with two different particle sizes (shown as "Std Alum" and "Mesh Alum").

DETAILED DESCRIPTION OF SPECIFIC EMBODIMENTS

Definitions. As used in this description and the accompanying claims, the following terms shall have the meanings indicated, unless the context otherwise requires:

A "mixed salt" is a compound with a given proportion of two salts, in some instances sharing either a common cation or common anion.

The "moisture content" of a composition such as a litter amendment is expressed as the percentage of weight change exhibited by the composition in relation to its original, dry weight.

A mixed salt product was formed according to embodiments of the present invention that optimizes the benefits of both sodium bisulfate and aluminum sulfate and also minimizes the drawbacks of the individual products. The mixed salt product has the ability to absorb ammonia from animal manure, even in conditions of low humidity, while still binding the phosphorus from the manure. In addition, the mixed salt product may be added as a litter amendment with a stable granular formulate that is easy to apply to a portion of barns and henhouses to reduce the ammonia emissions.

Figure 1:
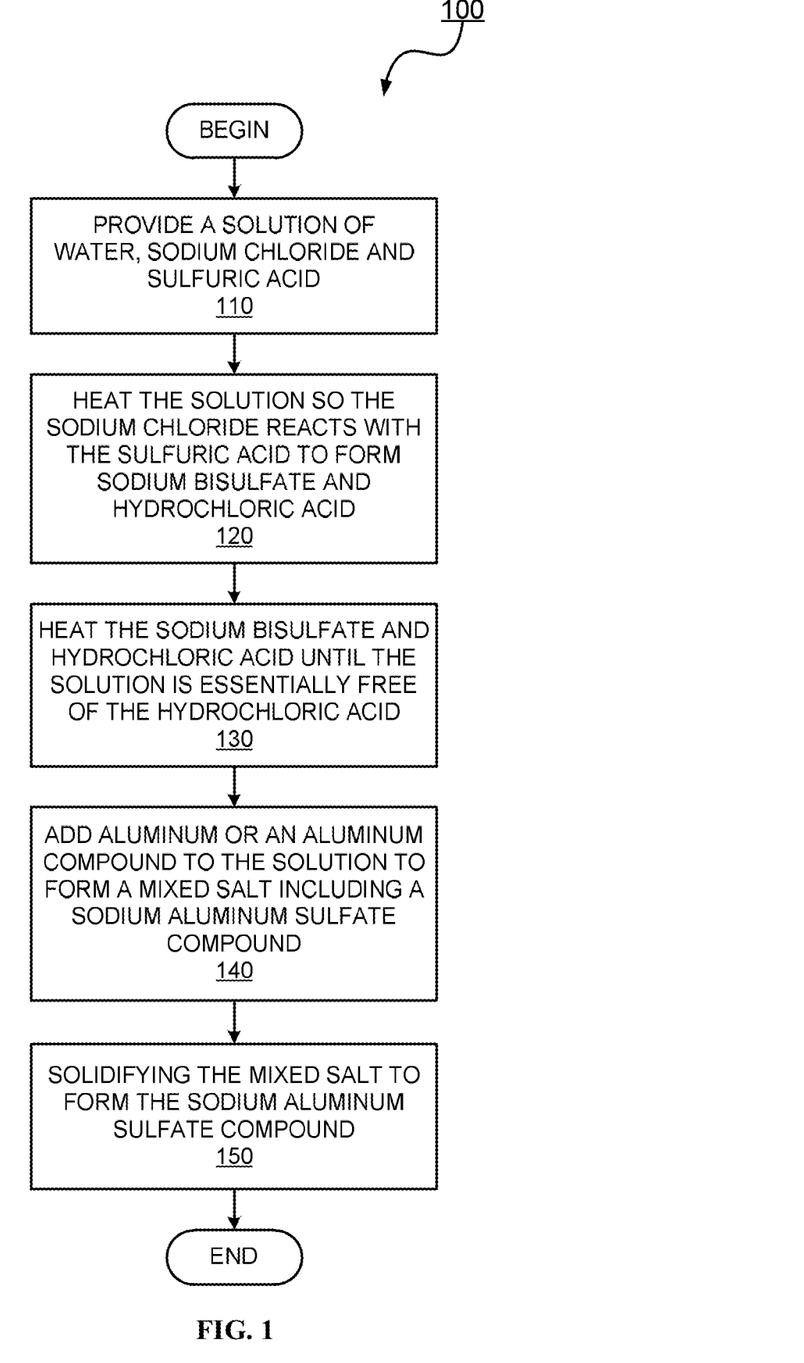
FIG. 1 shows a process of forming a mixed salt according to embodiments of the present invention.

FIG. 1 shows a process 100 of forming a mixed salt according to embodiments of the present invention. In step 110, a solution is provided that includes water, sodium chloride and sulfuric acid. In step 120, the solution is heated to a temperature between about 180° F. and about 300° F. (82° C. and 149° C.) so that the sodium chloride (NaCl) reacts with the sulfuric acid ($H_2SO_4$) to form sodium bisulfate ($NaHSO_4$) and hydrochloric acid (HCl) by an exothermic reaction. The reaction can be expressed as follows:

$$NaCl+H_2SO_4+H_2O \rightarrow HCl+NaHSO_4 \cdot H_2O \qquad (5)$$

The heating is continued to allow the off-gassing of the hydrochloric acid until the solution is essentially free of the hydrochloric acid (step 130). The solution may have additional sulfuric acid left over after the reaction. For example, the reaction may be as follows:

$$2NaCl+5H_2SO_4 \rightarrow 2HCl+2NAHSO_4+3H_2SO_4 \qquad (6)$$

Alternatively, an additional amount of sulfuric acid may be added to the solution, either before or after the continued heating in step 130 that drives off the hydrochloric acid, in order to tailor the reaction parameters. An additional amount of water may also be added to the solution.

In step 140, aluminum or an aluminum compound is added to the solution to form a mixed salt that includes a sodium aluminum sulfate compound. For example, the aluminum compound may include alumina ($Al_2O_3$), either dry or in its hydrated forms (e.g., $Al_2O_3 \cdot 3H_2O$), bauxite, and/or aluminum clays. For example, the mixed salt may be made by digesting aluminum oxide trihydrate in an aqueous solution of sulfuric acid and sodium bisulfate. The sodium bisulfate may be generated in situ by the reaction of sodium chloride with the sulfuric acid. For example, the reaction may be expressed as follows:

$$2NaHSO_4+3H_2SO_4+Al_2O_3 \cdot 3H_2O+xH_2O \rightarrow Na_2Al_2H_2(SO_4)_5 \cdot (x+6)H_2O \qquad (7)$$

Where x=6 to 14.

The relative amounts of sodium bisulfate to the aluminum compound may be in a weight-to-weight ratio of about 20:80 wt % to about 40:60 wt %. For example, the relative amounts of sodium bisulfate to the aluminum compound may be in a weight-to-weight ratio of about 30:70 wt % to about 35:65 wt %. In instances where the sodium bisulfate is produced in situ, the amount of sodium chloride in the first reaction (shown in Equations 5 or 6) should be sufficient to yield sodium bisulfate in amounts within the ranges specified above. The aluminum compound may be aluminum sulfate having a standard particle size in the range of about 180 μm to about 1700 μm in diameter (e.g., about 600 μm to about 1400 μm), a smaller, finer particle size in the range of about 10 μm to about 1400 μm in diameter (e.g., about 10 μm to about 600 μm), or a mixture of the two particle sizes.

Figure 2A:
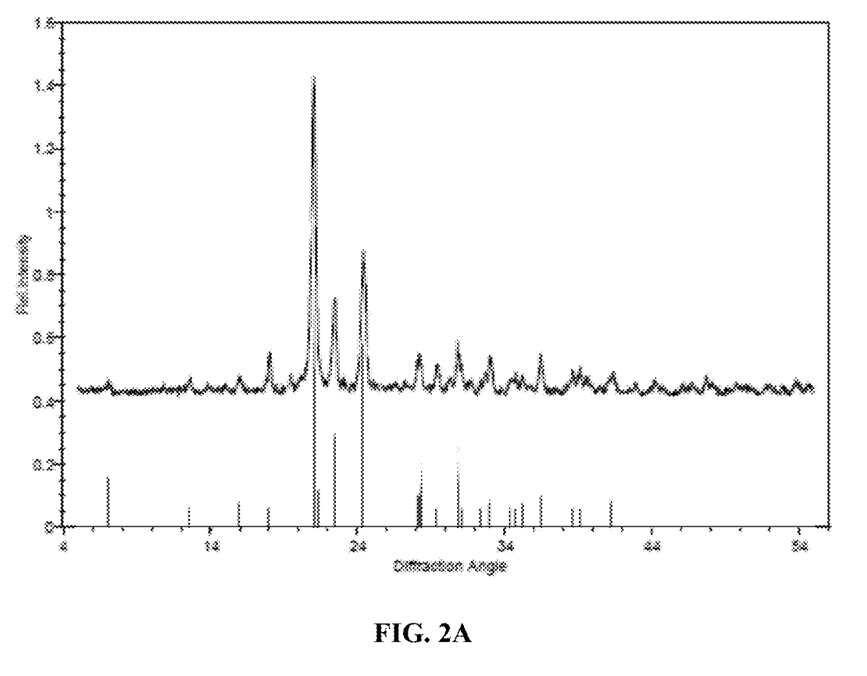
FIG. 2A is an X-ray diffraction pattern of a sample of a mixed salt (graph on top) formed according to embodiments of the present invention with a stick pattern for reference from a sample of $NaAl(SO_4)_2$ (graph on bottom)
Figure 2B:
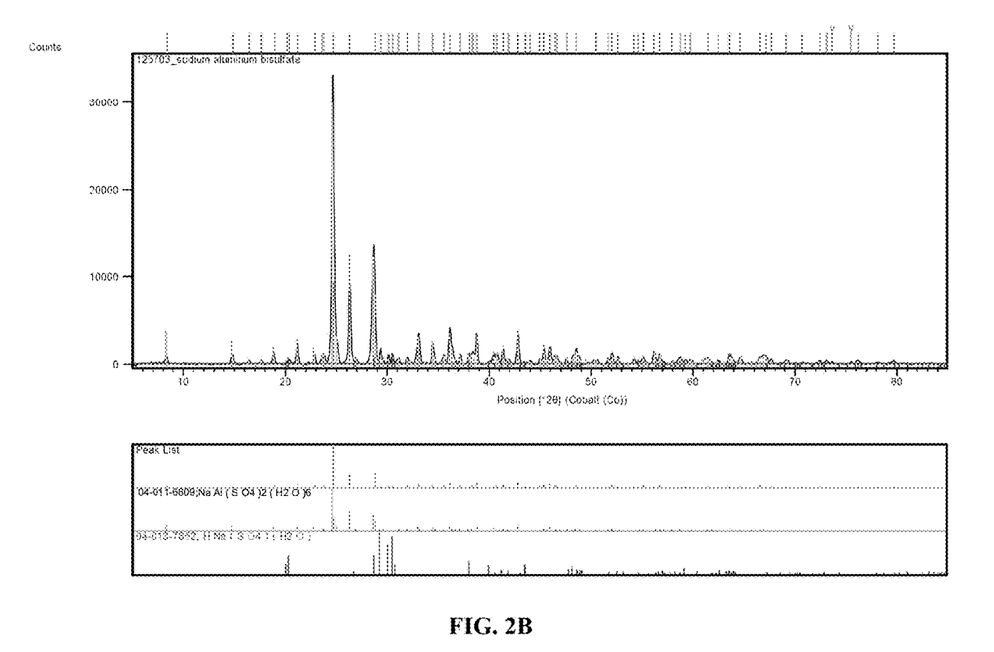
FIG. 2B is another X-ray diffraction pattern of a sample of a mixed salt (graph on top) formed according to embodiments of the present invention with a stick pattern for reference from samples of $NaAl(SO_4)_2 \cdot 6H_2O$ and $HNa(SO_4) \cdot H_2O$ (graphs on bottom)

In step 150, the mixed salt is solidified in order to form the sodium aluminum sulfate compound. For example, the sodium aluminum sulfate compound may be solidified by cooling the mixed salt to below its freezing point. The sodium aluminum sulfate compound may be sodium aluminum bisulfate, sodium aluminum sulfate and/or sodium aluminum hydrosulfate. The structure of this compound is confirmed by X-ray diffraction analysis, as shown in FIGS. 2A and 2B. In some embodiments, the sodium aluminum sulfate compound may be essentially free of sulfuric acid.

FIG. 2A shows an X-ray diffraction (XRD) pattern of the sodium aluminum sulfate compound (graph on top) formed according to embodiments of the present invention with a stick pattern (graph on bottom) for reference from a sample of $NaAl(SO_4)_2$. The XRD pattern was made using a Phillips XRD instrument and analyzed with Cu K-alpha radiation at 30 kV and 15 mA. The XRD pattern shown in FIG. 2A is consistent with a crystal of $Na_2Al_2H_2(SO_4)_5 \cdot 6H_2O$ or $Na_2Al_2(SO_4)_5 \cdot 6H_2O$. FIG. 2B shows another XRD pattern of the sodium aluminum sulfate compound (graph on top) formed according to embodiments of the present invention with stick patterns (graphs on bottom) for reference from samples of $NaAl(SO_4)_2 \cdot 6H_2O$ and $HNa(SO_4) \cdot H_2O$. The sodium aluminum sulfate compound sample was scanned on a Panalytical X'Pert Pro MPD over the range $5<2\theta<85°$ using Co-Kα radiation, a 0.033° step size, and a 400 sec/step count time. Crystalline phases in the XRD pattern were identified by comparing Bragg peak positions and relative intensities to those from reference patterns in the ICDD database. The sample contained peaks that matched reference patterns for $NaAl(SO_4)_2 \cdot 6H_2O$ (tamarugite, sodium aluminum sulfate hydrate) and $HNa(SO_4) \cdot H_2O$ (matteuccite, hydrogen sodium sulfate hydrate). Thus, as shown further below in the working examples, embodiments of the present invention react sodium bisulfate with aluminum sulfate to produce a dry material of the sodium aluminum sulfate compound, which may be sodium aluminum bisulfate, sodium aluminum sulfate and/or sodium aluminum hydrosulfate. The sodium aluminum sulfate compound can be commercially processed and optimizes the benefits and reduces the negative effects of both sodium bisulfate and aluminum sulfate products alone.

The sodium aluminum sulfate compound may be used as an active ingredient in poultry or livestock litter amendment compositions. When applied to animal litter, the sodium aluminum sulfate compound activates under low humidity conditions, can last long enough to prevent ammonia breakthrough, and can reduce the amount of phosphorous that leaches out of the animal litter. Accordingly, embodiments of the present invention provide a litter amendment composition that may be used to treat animal waste, for example livestock manure in barns or poultry droppings in henhouses. At the same time, the amendment is capable of retaining phosphorus at levels attained by aluminum sulfate. As a result, the litter amendment composition of the present application combines the desirable properties of sodium bisulfate and aluminum sulfate while minimizing their respective drawbacks.

In a further embodiment of the invention, there is provided a method for controlling ammonia levels in enclosed spaces where poultry or livestock are raised, such as barns and henhouses. The method includes providing the litter amendment with the sodium aluminum sulfate compound formed according to embodiments of the present invention and applying the litter amendment to a portion of the enclosure. By applying the litter amendment to surfaces where droppings tend to accumulate or are collected, the production and emission of ammonia is reduced while the phosphorus in the droppings is retained, thereby protecting the animals in the enclosure from unhealthy or toxic levels of atmospheric ammonia while producing a phosphorus-rich fertilizer. The litter amendment with the sodium aluminum sulfate compound may be particularly beneficial for controlling ammonia emissions in conditions with low atmospheric humidity and low amounts of moisture in the litter, such as seen during the winter months. For example, the enclosure may have an atmospheric humidity of below 45% or below 35% and may have a temperature of below about 86° F. (30° C.).

EXAMPLES

Several attempts to make the mixed salt were conducted with various amounts of the sodium bisulfate to the aluminum compound ratio. The amounts of the components are shown in Table 1 for Examples 1-5. The sodium bisulfate and the aluminum compound used for Examples 1-5 had a particle size in the range of about 10 μm to about 2000 μm in diameter.

Example 1

The salt (sodium bisulfate) and alumina was reacted with the sulfuric acid to form a salt slurry that immediately began to release hydrogen chloride. The ratio of Sodium Bisulfate to dry Alum (aluminum sulfate) was chosen to be 40:60 wt %. The slurry was heated and allowed to react until all of the salt had dissolved. At this point the addition of the hydrate and water began to form a solution. Once the solution began to solidify, the solution was poured into a mold and allowed to cool. Once cool, the product produced a white odorless solid that was difficult to grind. The material wanted to smear rather than grind. The processing parameters are shown in Table 2.

Example 2

Followed the sequence used for Example 1 except changed the ratio of Sodium Bisulfate to alum and used a ratio of 20:80. The sample produced a white odorless solid that was easy to grind. The processing parameters are shown in Table 3.

Example 3

Repeated the sequence used for Example 1 with the ratio of Sodium Bisulfate to alum of 40:60. The sample produced the same results as Example 1. The processing parameters are shown in Table 4.

Example 4

Followed the sequence used for Example 1 except changed the ratio of Sodium Bisulfate to alum and used a ratio of 30:70. The sample produced a white odorless solid that was easy to grind. The processing parameters are shown in Table 5.

Example 5

Followed the sequence used for Example 1 except changed the ratio of Sodium Bisulfate to alum and used a ratio of 35:65. The sample produced a white odorless solid that was easy to grind. The processing parameters are shown in Table 6.

Sodium bisulfate may be incorporated into the dry alum and still produce a dry material that can be commercially processed up to at least a ratio of 35:65. The hydroscopic properties and corrosiveness of the material was further evaluated to see if the resulting product had achieved the desired properties.

Example 6

The relative humidity thresholds for activation were analyzed for different litter amendments: aluminum sulfate, sodium bisulfate, and a mixed salt product produced according to Example 5 above. A temperature and humidity controlled chamber was used to determine the relative humidity threshold for activation. The temperature of the chamber was controlled by a heater and set to 88° F. (31.1° C.), which is the typical set point for broiler houses during brooding periods. The relative humidity of the chamber was set to 35, 40, 45, 50, and 60%. Three grams of each litter amendment were placed in glass containers and exposed to the different relative humidity levels at 88° F. over a three-day period.

Figure 3A:
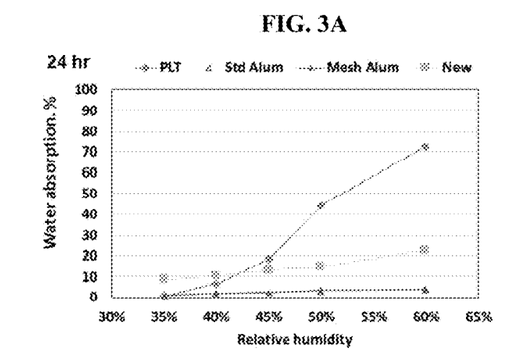
FIG. 3A shows the results after 24 hours.
Figure 3B:
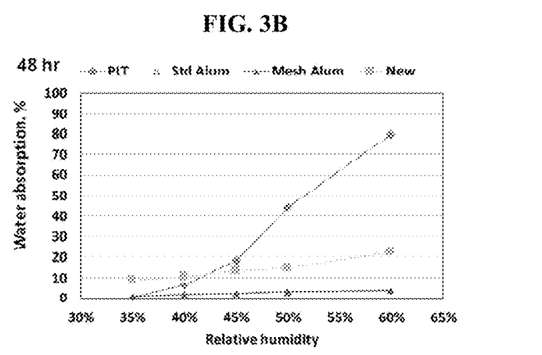
FIG. 3B shows the results after 48 hours.
Figure 3C:
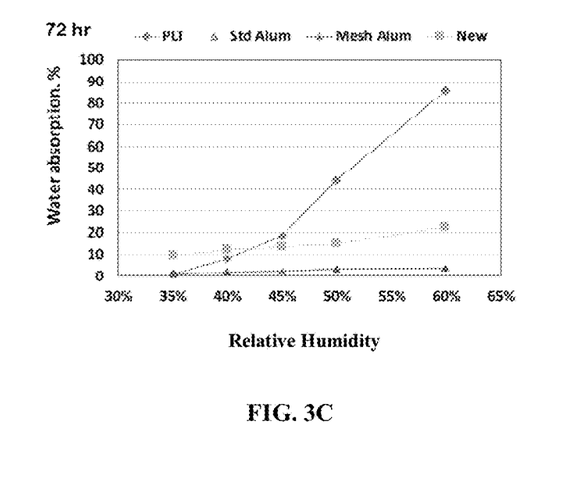
FIG. 3C shows the results after 72 hours.

The results are shown in FIGS. 3A-3C for three types of litter amendments, a mixed salt (shown as "New") formed according to embodiments of the present invention, sodium bisulfate (shown as "SB") with a particle size of about 250 μm to about 1180 μm in diameter, and aluminum sulfate with two different particle sizes (shown as "Std Alum" having a particle size with about 95% in the range of about 180 μm to about 1700 μm in diameter and "Mesh Alum" having a smaller particle size with about 95% in the range of about 10 μm to about 600 μm in diameter). The weight changes of the litter amendments were measured at 24 hours (FIG. 3A), 48 hours (FIG. 3B), and 72 hours (FIG. 3C) post onset to determine the water absorption rate that was a direct indicator for the relative humidity activation threshold of the litter amendments.

Aluminum sulfate absorbed the least amount (1% to 3.5% by weight) of water over the three-day period at all relative humidity levels. Sodium bisulfate exhibited a low water absorption rate (<7%) when relative ambient humidity was lower than 45%. The water absorption rate of sodium bisulfate increased to 19% at 45% relative ambient humidity and the bulk of water absorption took place during the first 24 hours. The mixed salt was more hydroscopic than the other amendments when relative humidity was less than 45%, and absorbed 9% to 12% water from the ambient air. The water absorption rate of the mixed salt increased to 23% when relative humidity was at 60%. The results show that ambient air could not provide sufficient water to activate aluminum sulfate under normal conditions during the beginning of a winter flock season when relative humidity was lower than 60%. The relative humidity threshold for sodium bisulfate was about 45%. The results indicated that the inclusion of sodium bisulfate may assist the activation of aluminum sulfate when relative humidity was 45% or higher. The mixed salt was a better option to control ammonia when relative humidity is lower than 45%.

Example 7

Figure 4:
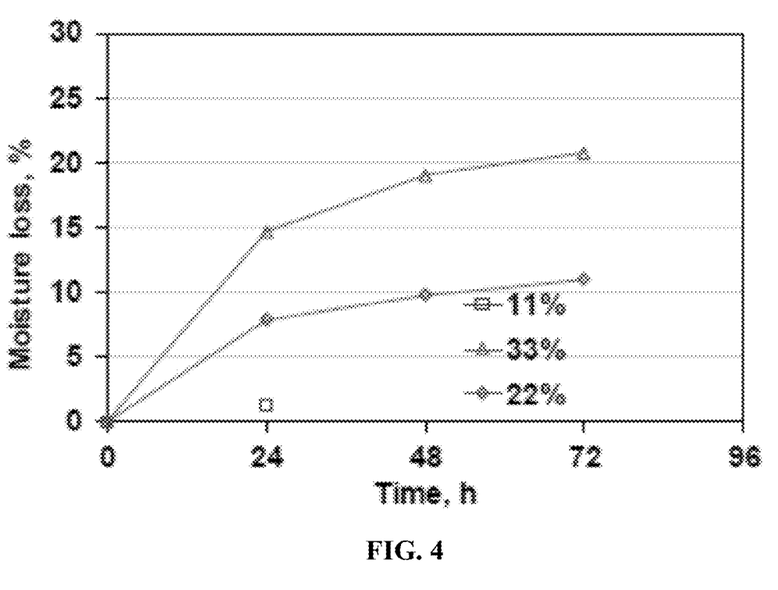
FIG. 4 is a graph showing moisture loss from litter as a function of time for three moisture levels under an atmosphere at 45% relative humidity.

The effect of threshold relative humidity on litter moisture content changes was evaluated. The results are shown in FIG. 4. The litter moisture losses were analyzed at 45% relative humidity. Broiler litter samples (20 g each) at three moisture levels (11%, 22%, and 33%) were placed in an environmental chamber with 45% relative humidity over a three-day period. The temperature of the chamber was controlled by a heater and set to 88° F. (31.1° C.). Litter weight losses of the litter samples were measured at 24, 48, and 72 hours post initial set up to determine the moisture content changes. Litter kept losing moisture to the environment when its moisture level was higher than 12%. Litter could provide moisture to the air and serve as a water source when the ambient air is dry. The results suggested that the litter moisture should be above 12% when air relative humidity was at 45% when using a litter amendment that included sodium bisulfate.

Example 8

Figure 5:
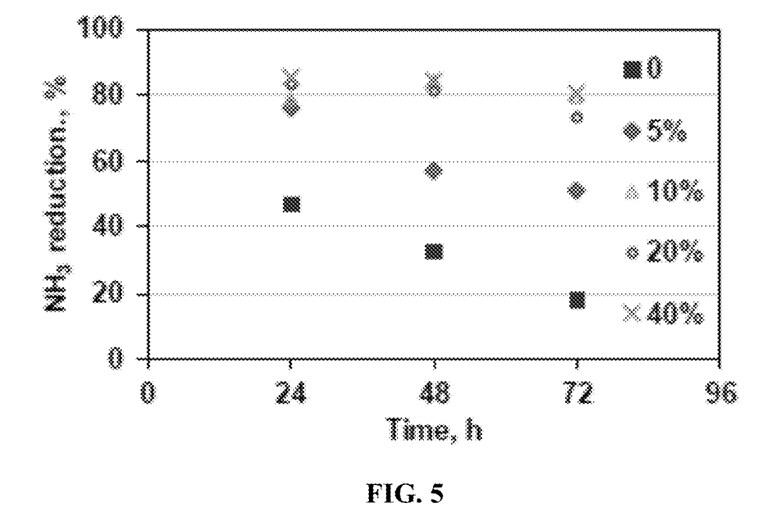
FIG. 5 is a graph showing ammonia reduction as a function of time for aluminum sulfate with different inclusion rates of sodium bisulfate under an atmosphere at 45% relative humidity and a litter with a moisture content of 22%.

The effect of a dry mixture of aluminum sulfate and sodium bisulfate was measured to determine its effectiveness to control the ammonia emissions. The results are shown in FIG. 5. The ammonia emission vessel system used included ten 1-L (one-liter) glass mini emission vessels. Two-inch litter samples were place in each mini emission vessel. A dry blended mixture of aluminum sulfate with five different sodium bisulfate inclusion amounts (0%, 5%, 10%, 20%, and 40%) was applied to the top of the litter (22% moisture content) in each mini emission vessels and the litter samples were incubated in the environmental chamber for a period of three days at the threshold relative humidity level of 45% at 30° C. Each mixture was applied in the amount of 100 lbs./1000 ft². The mini emission vessels were measured for ammonia emission after 24, 48, and 72 hours with an ammonia gas analyzer at a flow rate of 0.36 L/min to determine the efficiency of the litter amendments when the relative humidity was at the activating threshold.

The ammonia emissions of the treated litter samples were compared to determine the effectiveness of the different mixtures. Surface application of aluminum sulfate, without or with sodium bisulfate, on broiler litter substantially reduced $NH_3$ emission during the three-day storage period. The extent of the reduction was generally affected by the amount of sodium bisulfate included with the aluminum sulfate. Aluminum sulfate with smaller particles (e.g., particle size in the range of about 10 μm to about 600 μm in diameter was used since there were no difference between the two different particle sizes on the water absorption evaluated in Example 6. Therefore, the product with smaller particle size may be activated easier with its larger surface area. The $NH_3$ reduction rates of 0% and 5% inclusion rates were much lower than the higher rates while there was no significant difference among the three higher rates (10%, 20%, and 40%). The results suggested that 10% inclusion rate of sodium bisulfate is sufficient to activate aluminum sulfate when relative humidity was about the threshold level 45%.

Example 9

Figure 6A:
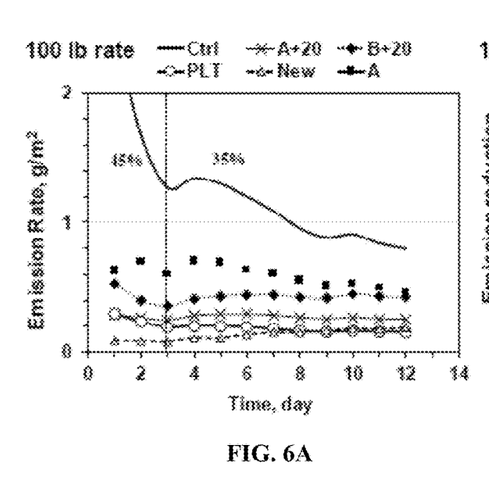
FIGS. 6A and 6B are graphs showing ammonia emission and reduction, respectively, for a mixed salt (shown as "New") formed according to embodiments of the present invention, sodium bisulfate (shown as "SB"), aluminum sulfate with a standard size particle ("shown as A") or a dry blended mixture of aluminum sulfate with 20% sodium bisulfate (shown as "A+20") and a dry blended mixture of aluminum sulfate with a finer size particle with 20% sodium bisulfate (shown as "B+20"), and without any treatment (shown as "Ctrl") in an amount of 100 lb/10,000 ft² under an atmosphere at 45% and then 35% relative humidity with a 20% litter moisture content.
Figure 6B:
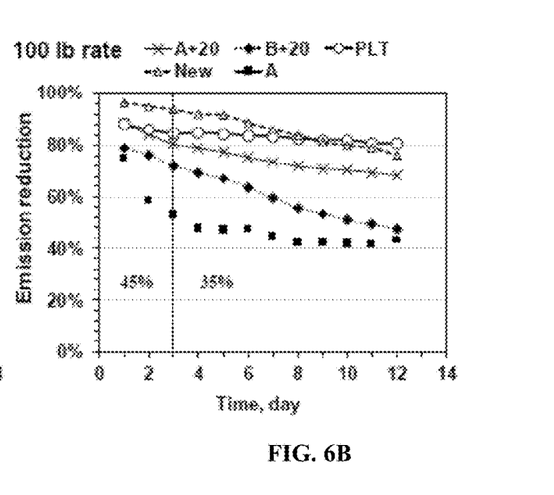

The ammonia management guidelines were determined under winter conditions during brooding for aluminum sulfate, sodium bisulfate, a dry mixture of aluminum sulfate and sodium bisulfate, and a mixed salt produced according to embodiments of the present invention. The parameters used are shown in Table 7 below and the results are shown in FIGS. 6A-6B for Test 1, FIGS. 7A-7B for Test 2, FIGS. 8A-8B for Test 3, and FIGS. 9A-9B for Test 4.

TABLE 7

| Test | Treatment[1]* | Rate, lbs./ ft[2] | Relative Humidity[2], % | | | Litter moisture content, % |
|---|---|---|---|---|---|---|
| | | | 0 to 3 d | 4-7 d | 8-13 d | |
| 1 | A, 80% A + 20% C, 80% B + 20% C, New, C | 100 | TH | 35 ± 5 | 35 ± 5 | 20 |
| 2 | B, 80% A + 20% C, 80% B + 20% C, New, C | 100 | 30 ± 5 | TH | | 20 |
| 3 | A, 80% A + 20% C, 80% B + 20% C, New, C | 50 | TH | 35 ± 5 | | 20 |
| 4 | B, 80% A + 20% C, 80% B + 20% C, New, C | 100 | TH | 35 ± 5 | | 25 |

*A: aluminum sulfate with standard particle size; B: aluminum sulfate with finer particle size; C: sodium bisulfate having a particle size ranging from about 250 μm to about 1180 μm in diameter; New: mixed salt formed according to embodiments of the present invention.
[1]20% was selected as sodium bisulfate inclusion rate on the basis of Examples 6-8.
[2]TH (45% at 30° C.) is the relative humidity threshold of initial activation.

Twelve 19-L emission vessels were used to determine the environmental management guidelines. The vessels were placed in an environment-controlled room that was kept at a constant temperature of 30° C. while the relative humidity was maintained at two different levels, 45% and 35%. The room relative humidity control system included PC-based humidity control program, relative humidity sensors, a dehumidifier, and a humidifier. The vessels were operated under positive pressure. A pump was used to supply fresh air to the emission vessels. The flow rate of the fresh air supply was controlled and measured with an air mass flow controller. A flow rate of 2.5 LPM (liters per minute) was established inside each vessel, resulting in an air exchange rate of 10 air changes per hour (ACH).

Samples of the exhaust air from each of the vessels, the supply air and the ambient air were sequentially taken and analyzed at 5 minute intervals, with the first 4 minutes for stabilization and the last 1 minute for measurement. This yielded a measurement cycle of 1 hour for each vessel. The ammonia concentrations were measured with the same ammonia gas analyzer that was used for the mini vessel system used in Example 6.

The mixed salt, the aluminum sulfate with two different particle sizes, and the sodium bisulfate were tested to determine optimal application rates during brooding under different relative humidity levels simulating the winter conditions. Used litter samples from a commercial farm at two moisture contents (20% and 25%) were treated with five different amendments and compared with untreated litter in the 12-bucket emission system. Different treatments were topically applied to the litter samples (4 inches depth). Two application rates (50 and 100 lbs./1000 ft[2]) were tested. The ammonia emissions of the treated litter samples were compared to determine the effectiveness of the different amendments.

FIGS. 6A and 6B show the results of the ammonia emission and reduction, respectively, for a mixed salt (shown as "New") formed according to embodiments of the present invention, sodium bisulfate (shown as "SB") with a particle size ranging from about 250 μm to about 1180 μm in diameter, aluminum sulfate with about 95% of its particle sizes ranging from about 180 μm to about 1700 μm in diameter ("shown as A") or a dry mixture of aluminum sulfate with 20% sodium bisulfate (shown as "A+20"), a dry mixture of aluminum sulfate with a finer particle size ranging from about 10 μm to about 600 μm in diameter with 20% sodium bisulfate (shown as "B+20"), and without any treatment (shown as "Ctrl"). The amendments were applied in the amount of 100 lb/10,000 ft[2] with a litter having a moisture content of 20%. The atmospheric relative humidity was kept at 45% for the first three days, and then reduced to 35% for the rest of the testing period.

As shown in FIG. 6B, the mixed salt and sodium bisulfate had the best reduction (>80%) in ammonia emission levels over the period of thirteen days. Ammonia emission reduction by the aluminum sulfate varied from 75% on day 1 to 40% on day 11. The results showed that the dry mixture of 20% sodium bisulfate with the aluminum bisulfate assisted the activation of aluminum sulfate. The average reduction rates of aluminum sulfate having standard particle size and finer particle size with 20% sodium bisulfate were 62% and 76% respectively, 87% for the mixed salt, and 84% for pure sodium bisulfate.

Figure 7A:
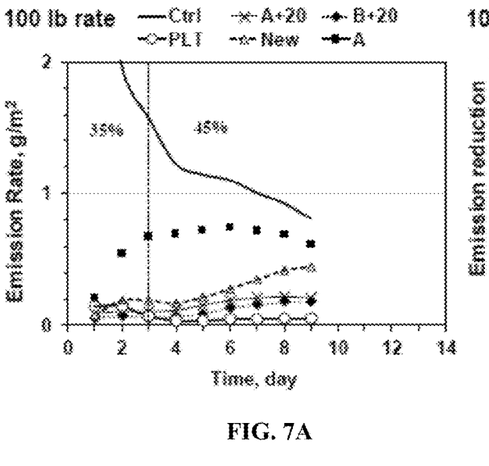
FIGS. 7A and 7B are graphs showing ammonia emission and reduction, respectively, for a mixed salt (shown as "New") formed according to embodiments of the present invention, sodium bisulfate (shown as "SB"), aluminum sulfate with a standard size particle ("shown as A") or a dry mixture of aluminum sulfate with 20% sodium bisulfate (shown as "A+20"), a dry mixture of aluminum sulfate with a finer size particle with 20% sodium bisulfate (shown as "B+20"), and without any treatment (shown as "Ctrl") in an amount of 100 lb/10,000 ft² under an atmosphere at 35% and then 45% relative humidity with a 20% litter moisture content.
Figure 7B:
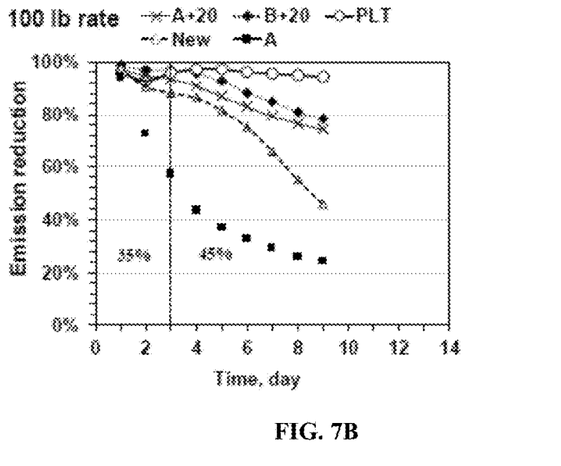

FIGS. 7A and 7B show the results of the ammonia emission and reduction, respectively, for a mixed salt (shown as "New") formed according to embodiments of the present invention, sodium bisulfate (shown as "SB") with a particle size ranging from about 250 μm to about 1180 μm in diameter, aluminum sulfate with about 95% of its particle sizes ranging from about 180 μm to about 1700 μm in diameter ("shown as A") or a dry mixture of aluminum sulfate with 20% sodium bisulfate (shown as "A+20"), a dry mixture of aluminum sulfate with a particle size ranging from about 10 μm to about 600 μm in diameter with 20% sodium bisulfate (shown as "B+20"), and without any treatment (shown as "Ctrl"). The amendments were applied in the amount of 100 lb/10,000 ft[2] with a litter having a moisture content of 20%. The atmospheric relative humidity was kept at 35% for the first three days, and then changed to 45% for the rest of the testing period.

The results indicated that there was not enough moisture to activate aluminum sulfate without the inclusion of sodium bisulfate. The reduction in ammonia emission in the presence of the aluminum sulfate without sodium bisulfate was higher than 70% for only two days and the nine-day average reduction rate was 46% while the rate was 90% when 20% sodium bisulfate was used. The performance of the mixed salt was lower than in Test 1, which started at a higher relative humidity level. Therefore, higher relative humidity (45% or higher) is important to maintain to ensure the activation of the mixed salt.

Figure 8A:
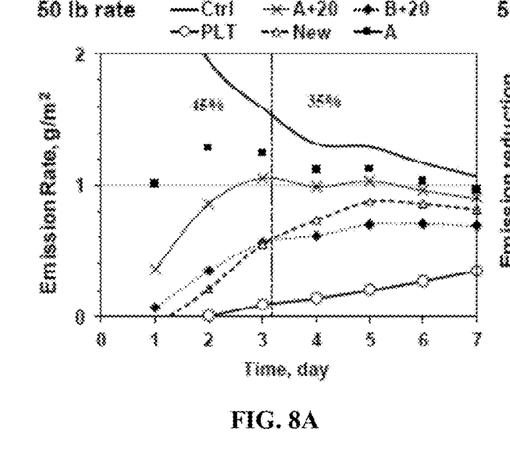
FIGS. 8A and 8B are graphs showing ammonia emission and reduction, respectively, for a mixed salt (shown as "New") formed according to embodiments of the present invention, sodium bisulfate (shown as "SB"), aluminum sulfate with a standard size particle ("shown as A") or mixed with 20% sodium bisulfate (shown as "A+20"), aluminum sulfate with a finer size particle mixed with 20% sodium bisulfate (shown as "B+20"), and without any treatment (shown as "Ctrl") in an amount of 50 lb/10,000 ft² under an atmosphere at 45% and then 35% relative humidity with a 20% litter moisture content.
Figure 8B:
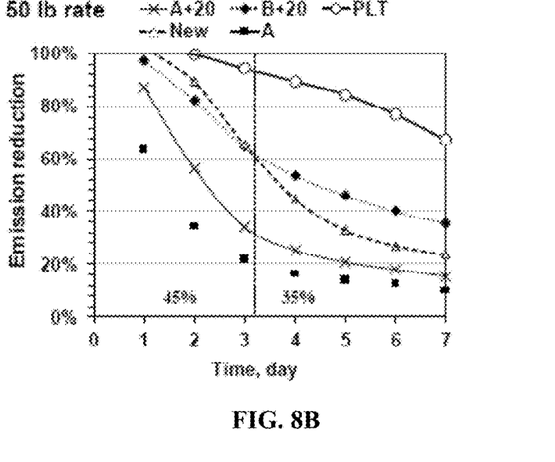

FIGS. 8A and 8B show the results of the ammonia emission and reduction, respectively, for a mixed salt (shown as "New") formed according to embodiments of the present invention, sodium bisulfate (shown as "SB") with a particle size ranging from about 250 μm to about 1180 μm in diameter, aluminum sulfate with about 95% of its particle sizes ranging from about 180 μm to about 1700 μm in diameter ("shown as A") or a dry mixture of aluminum sulfate with 20% sodium bisulfate (shown as "A+20"), a dry mixture of aluminum sulfate with a particle size ranging from about 10 μm to about 600 μm in diameter with 20% sodium bisulfate (shown as "B+20"), and without any treatment (shown as "Ctrl"). The amendments were applied in the amount of 50 lb/10,000 ft[2] and a litter having a moisture content of 20%. The atmospheric relative humidity was kept at 45% for the first three days, and then reduced to 35% for the rest of the testing period. As shown in FIGS. 8A-8B, the reduced litter amendment of 50 lbs./1000 ft$^2$ was too low to control ammonia emissions. The reduction in ammonia emission was less than 50% for aluminum sulfate with or without inclusion of sodium bisulfate after three to four days.

Figure 9A:
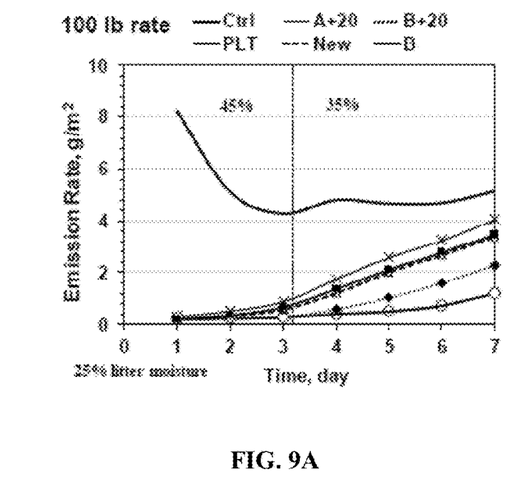
FIGS. 9A and 9B are graphs showing ammonia emission and reduction, respectively, for a mixed salt (shown as "New") formed according to embodiments of the present invention, sodium bisulfate (shown as "SB"), aluminum sulfate with a standard size particle ("shown as A") or mixed with 20% sodium bisulfate (shown as "A+20"), aluminum sulfate with a finer size particle mixed with 20% sodium bisulfate (shown as "B+20"), and without any treatment (shown as "Ctrl") in an amount of 100 lb/10,000 ft² under an atmosphere at 45% and then 35% relative humidity with a 25% litter moisture content.
Figure 9B:
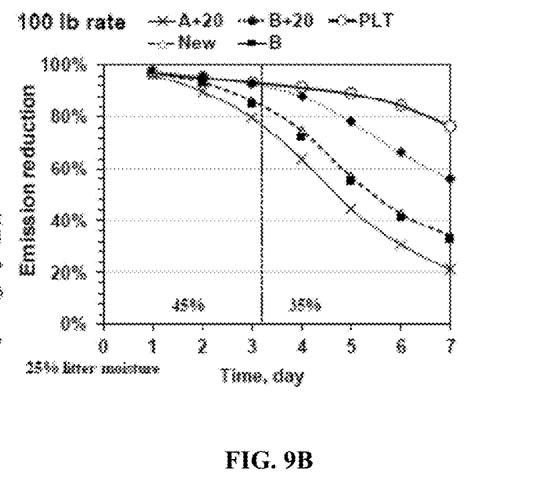

FIGS. 9A and 9B are graphs showing ammonia emission and reduction, respectively, for a mixed salt (shown as "New") formed according to embodiments of the present invention, sodium bisulfate (shown as "SB") with a particle size ranging from about 250 µm to about 1180 µm in diameter, aluminum sulfate with about 95% of its particle size ranging from about 180 µm to about 1700 µm in diameter ("shown as A") or a dry mixture of aluminum sulfate with 20% sodium bisulfate (shown as "A+20"), a dry mixture of aluminum sulfate with a particle size ranging from about 10 µm to about 600 µm in diameter with 20% sodium bisulfate (shown as "B+20"), and without any treatment (shown as "Ctrl"). The amendments were applied in the amount of 100 lb/10,000 ft$^2$ with a litter having a moisture content of 25%. The atmospheric relative humidity was kept at 45% for the first three days, and then reduced to 35% for the rest of the testing period. As shown in FIGS. 9A-9B, ammonia emission was suppressed by 80% for the first three days and then gradually increased. The results showed that aluminum sulfate with a finer particle size with 20% sodium bisulfate performed better than the mixed salt or the aluminum sulfate with the standard particle size with 20% sodium bisulfate. The ammonia emission rate of untreated litter with a moisture content of 25% was about two times higher than that of the litter with a moisture content of 20%. By the end of the seven-day period, the aluminum sulfate with a finer particle size with 20% sodium bisulfate still reduced ammonia emission by 60% compared to untreated litter. There was no difference between the reduction of ammonia emission achieved with the mixed salt and the ammonium sulfate with standard particle size.

As shown in FIGS. 6A-9B, the amount of water available in the litter and ambient air affected the efficacy of acid-based litter amendments. The litter amendment has to be hydrolyzed and dissolved in water before it can reduce pH and control ammonia emissions. The results showed that when litter moisture content was about 20% (or lower), the drier litter did not provide enough moisture to activate aluminum sulfate. When litter moisture content was 25% or higher, the litter released moisture to air and activated aluminum sulfate without inclusion of a deliquescence material such as sodium bisulfate. The mixed salt was able to absorb 10% of its body weight in moisture from dry air even when the air relative humidity was below 40%. However, the mixed salt was not liquefied under higher relative ambient humidity (65%) when the litter moisture content was below 25%.

There was no significant difference between treatments with sodium bisulfate and aluminum sulfate with 20% sodium bisulfate during the first three days when relative humidity was kept at 45% or higher. Sodium bisulfate had better ammonia reduction than sodium bisulfate when relative humidity was below 40%. There was a layer of crust formed at the surface of the treated litter when sodium bisulfate deliquesced. The crust appears to serve as a barrier or shell that reduced the litter surface area exposed to air and thus reduced ammonia emission.

The aluminum sulfate with a finer particle size had very slight better performance than the aluminum sulfate with a standard particle size due to the smaller particles and large surface area contacting the litter. The results show that the mixed salt formed according to embodiments of the present invention can be used to control ammonia emission with a comparable application rate used for sodium bisulfate and aluminum sulfate. Ammonia emission is affected by litter moisture condition and nutrient composition. Therefore, the actual aluminum sulfate application rate should be adjusted based on litter condition. Windrowing litter could cause high ammonia emission from litter due to the composting effect. A windrowed animal enclosure should be vented for at least 48 hours to flush the built-up ammonia in the litter prior to litter amendment application.

Data Analysis of Examples 6-9

Statistical analyses of the water absorption, moisture loss, and ammonia emission reduction data discussed in Examples 6-9 were performed with multiple comparison (JMP 11.0, SAS). Significant differences for all comparisons were based on $P<0.05$.

Although the above discussion discloses various exemplary embodiments, those skilled in the art may make various modifications to, or variations of, the illustrated embodiments without departing from the inventive concepts disclosed herein.

What is claimed is:

1. A method for producing a mixed salt of sodium and aluminum, the method comprising:
   providing a solution comprising water, sodium chloride and sulfuric acid;
   heating the solution to a temperature between 180° F. and 300° F. (82° C. and 149° C.) so that the sodium chloride reacts with the sulfuric acid to form sodium bisulfate and hydrochloric acid and continue heating until the solution is essentially free of the hydrochloric acid;
   adding aluminum or an aluminum compound to the solution to form the mixed salt comprising a sodium aluminum sulfate compound; and
   solidifying the mixed salt to form the sodium aluminum sulfate compound.

2. The method of claim 1, wherein the sodium aluminum sulfate compound includes sodium aluminum sulfate, sodium aluminum bisulfate, sodium aluminum hydrosulfate, and combinations thereof.

3. The method of claim 2, wherein the sodium aluminum bisulfate is of formula $Na_2Al_2H_2(SO_4)_5\text{-}(x+6)H_2O$ where x is a positive integer ranging from 6 to 14.

4. The method of claim 2, wherein the sodium aluminum sulfate compound is sodium aluminum bisulfate and the method further comprises:
   digesting aluminum oxide trihydrate in an aqueous solution of sodium bisulfate and the sulfuric acid to form the sodium aluminum bisulfate.

5. The method of claim 4, further comprising reacting sulfuric acid and the sodium chloride to form the sodium bisulfate.

6. The method of claim 4, wherein a ratio of the sodium bisulfate to the aluminum compound is about 20:80 wt % to about 40:60 wt %.

7. The method of claim 4, wherein a ratio of the sodium bisulfate to the aluminum compound is about 30:70 wt % to about 35:65 wt %.

8. The method of claim 4, further comprising off-gassing HCl from the mixed salt.

9. The method of claim 1, wherein the aluminum compound is selected from the group consisting of $Al_2O_3$, $Al_2O_3.3H_2O$, bauxite, aluminum clay, and combinations thereof.

10. The method of claim 1, wherein the solidifying comprises cooling the mixed salt to below its freezing point.

11. A sodium aluminum sulfate compound manufactured according to the method of claim 1.

12. The sodium aluminum sulfate compound of claim 11, wherein the sodium aluminum sulfate compound is essentially free of sulfuric acid.

13. The sodium aluminum sulfate compound of claim 11, wherein the sodium aluminum sulfate compound includes sodium aluminum sulfate, sodium aluminum bisulfate, sodium aluminum hydrosulfate, and combinations thereof.

14. A poultry or livestock litter amendment comprising the sodium aluminum sulfate compound of claim 11.

15. A method for controlling ammonia levels in an enclosure for raising poultry or livestock, the method comprising:
    providing the litter amendment of claim 14; and
    applying the litter amendment to a portion of the enclosure.

16. The method of claim 15, wherein the enclosure has an atmospheric humidity of below 45%.

17. The method of claim 15, wherein the enclosure has an atmospheric humidity of below 35%.

18. The method of claim 15, wherein the enclosure has a temperature of below about 86° F. (30° C.).

* * * * *

UNITED STATES PATENT AND TRADEMARK OFFICE
CERTIFICATE OF CORRECTION

PATENT NO. : 10,869,459 B1
APPLICATION NO. : 16/237286
DATED : December 22, 2020
INVENTOR(S) : Dulko et al.

Page 1 of 1

It is certified that error appears in the above-identified patent and that said Letters Patent is hereby corrected as shown below:

In the Specification

In Column 1, Line 36:
Replace "$6NH_4OH + Al_2(SO_4)_3\ 14H_2O \rightarrow 3(NH_4)_2SO_4 + Na_2SO_4 + 4H_2O\ (2)$" with "$6NH_4OH + Al_2(SO_4)_3.14H_2O \rightarrow 3(NH_4)_2SO_4 + 2Al(OH)_3 + 14H_2O\ (2)$"

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*